United States Patent [19]

Teramachi

[11] Patent Number: 4,674,893
[45] Date of Patent: Jun. 23, 1987

[54] LINEAR-MOTION BEARING UNIT

[76] Inventor: Hiroshi Teramachi, 2-34-8,, Higashi-Tamagawa, Setagaya-Ku, Tokyo, Japan

[21] Appl. No.: 837,425

[22] Filed: Mar. 7, 1986

[30] Foreign Application Priority Data

Mar. 8, 1985 [JP] Japan .................................. 60-44594

[51] Int. Cl.⁴ ............................................. F16C 29/06
[52] U.S. Cl. ........................................ 384/45; 384/43
[58] Field of Search ............................. 384/43, 44, 45

[56] References Cited

U.S. PATENT DOCUMENTS 4,406,502  9/1983  Teramachi ........................... 384/45
4,478,462 10/1984  Teramachi ........................... 384/45
4,552,416 11/1985  Lehmann et al. ..................... 384/45

Primary Examiner—Stuart S. Levy
Assistant Examiner—Thomas R. Hannon
Attorney, Agent, or Firm—Kenyon & Kenyon

[57] ABSTRACT

A linear-motion bearing unit includes a track shaft and a bearing body. The bearing body has both skirts and a recess formed between the skirts, and is moved in a straight line along the track shaft by fitting the recess on the track shaft through the intermediary of rolling members. The linear-motion bearing unit further includes a longitudinal side plate made of a synthetic resin. The side plate is mounted within a longitudinal notch formed on the outer side of each skirt, such that the notched outer side of the skirt and the inner side of the side plate together form non-loaded rolling member rolling passages through which rolling members rolling between the bearing body and the track shaft are circulated.

5 Claims, 18 Drawing Figures

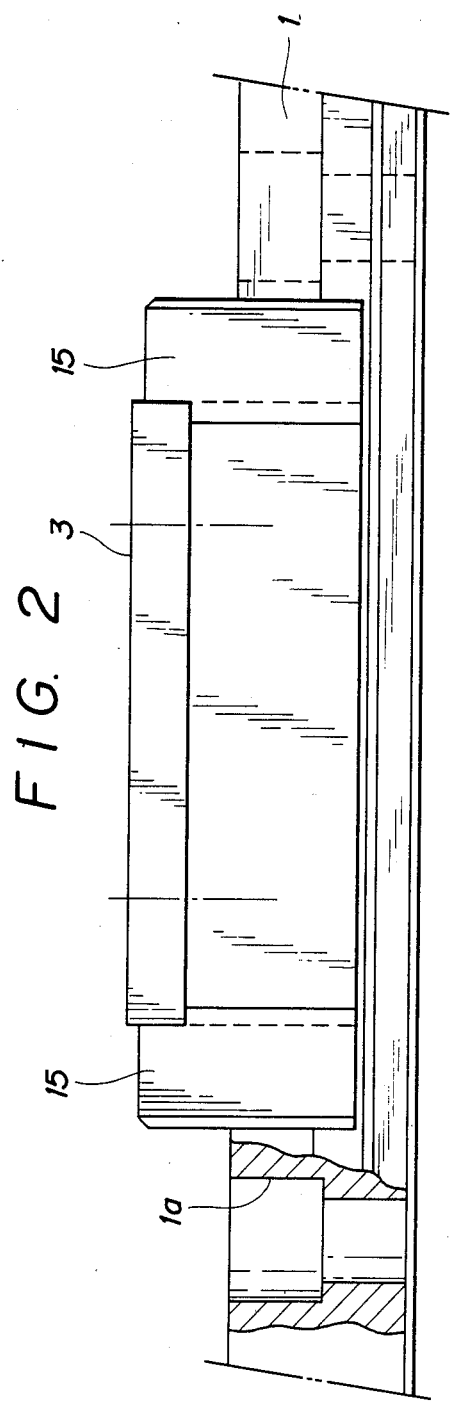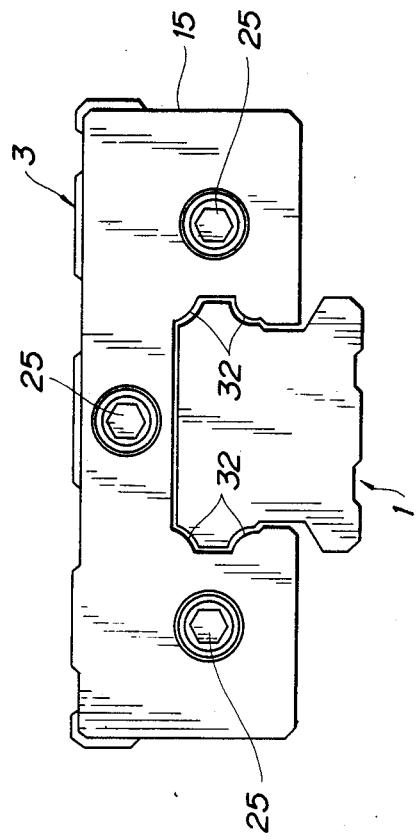

LINEAR-MOTION BEARING UNIT

BACKGROUND OF THE INVENTION

1. Field of the Invention

The present invention relates to a linear-motion bearing unit, and more specifically to such a bearing of type incorporating groups of recirculating balls for a minimum of friction. The linear bearing in accordance with the present invention is suitable for use in the table saddle of a machine tool or the sliding section of a machining center or conveyor where one part is to be moved back and forth relative to another.

2. Description of the Prior Art

A typical conventional linear-motion bearing unit will be explained hereinunder with specific reference to FIG. 17. This conventional linear-motion bearing unit has a bearing body 101 having an inversed U-shaped cross-section and mounted on a track shaft 103 through the intermediary of steel balls 102,102, in such a manner that it can move relative to the track shaft 103 in the longitudinal direction thereof, as shown in FIG. 17. This conventional bearing unit also includes longitudinal loaded ball rolling grooves 101a,101a which are formed on the inner side of the bearing body 101, and longitudinal loaded ball rolling grooves 103a,103a formed on each side of the track shaft, such that the loaded ball rolling grooves 101a,101a face the loaded ball rolling groove 103a,103a on each side of the track shaft 103. The bearing unit further has longitudinal non-loaded ball rolling bores 105,105 which are connected to the loaded ball rolling grooves 101a, 101a; 103a, 103a through ball turning passages provided in end plates (not shown) mounted on each both end of the bearing body. The non-loaded ball rolling bores 105, 105 are formed in each of skirts 104, 104 of the bearing body 101. A multiplicity of steel balls 102, 102 are charged in the ball rolling passages constituted by the loaded-ball rolling grooves 101a, 101a; 103a, 103a and the non-loaded ball rolling bores 105, 105 so that the steel balls can circulate in respective ball rolling passages when the bearing body 101 moves relative to the track shaft 103 in its axial direction. A retainer 106 having a pair of longitudinal slots 106a, 106a is disposed on each side of the bearing body 101. The steel balls 102, 102 rolling along the loaded ball rolling grooves 101a, 101a; 103a, 103a of the bearing body 101 and the track shaft 101 are guided by the slots 106a, 106a of the retainer which also serve to prevent the steel balls 102, 102 from coming off.

In such a conventional bearing unit, the non-loaded ball rolling bores 105, 105 are provided by being drilled in the longitudinal direction in the solid skirts 104, 104. In consequence, if the bearing body 101 is very long, it is difficult to conduct accurate drilling owing to the deflection of the drill which is used, or for other reasons. The drilling may alternatively be started from each end of the bearing body 101 and proceed all the way to the central portion thereof where a final hole is drilled. In that case, however, a step could easily be created at the central portion, and it may be compensated for by redrilling the hole or by reaming it. This requires a large amount of time and labour, resulting in an increase in cost.

This arrangement of a conventional bearing unit limits the length of the bearing body 101, so that the lengths of the loaded ball rolling grooves 101a, 101a; 103a, 103a are inevitably limited, and it is therefore difficult to increase the rated load of the ball bearing by increasing the lengths of the loaded ball rolling grooves.

The bearing body 101 of this conventional bearing unit is made of a steel and therefore generates a relatively high level of noise during rolling of the steel balls 102, 102 along the non-loaded ball holes 105, 105.

SUMMARY OF THE INVENTION

In view of the above-described problems of the known bearing unit, it is an object of the present invention to provide a linear-motion bearing unit which eliminates the need for the troublesome and time-consuming drilling of non-loaded ball rolling bores so as to achieve an increase in operational efficiency and a reduction in production cost, and to afford a greater load bearing capacity of the bearing through an increase in the the length of the bearing body as required, while reducing the level of noise, thereby assuring quiet operation.

To this end, according to the present invention, there is provided a bearing unit comprising a track shaft and a bearing body, the bearing body having two skirts and a recess formed between the skirts, the recess being fitted on the track shaft through the intermediary of rolling members so that the bearing body is moved in a straight line along the track shaft, characterized in that a longitudinal side plate made of a synthetic resin and mounted within a longitudinal notch formed on the outer side of each skirt of the bearing body, such that the notched outer side of the skirt and the inner side of the side plate together form non-loaded rolling member rolling passages through which rolling members rolling between the bearing body and the track shaft are circulated.

BRIEF DESCRIPTION OF THE DRAWINGS

FIG. 2 is a side elevational view of the bearing unit shown in FIG. 1;

FIG. 3 is a front elevational view of the bearing unit shown in FIG. 1;

FIG. 7 (b) is a perspective view of the side plate;

DESCRIPTION OF THE PREFERRED EMBODIMENT

Figure 1:
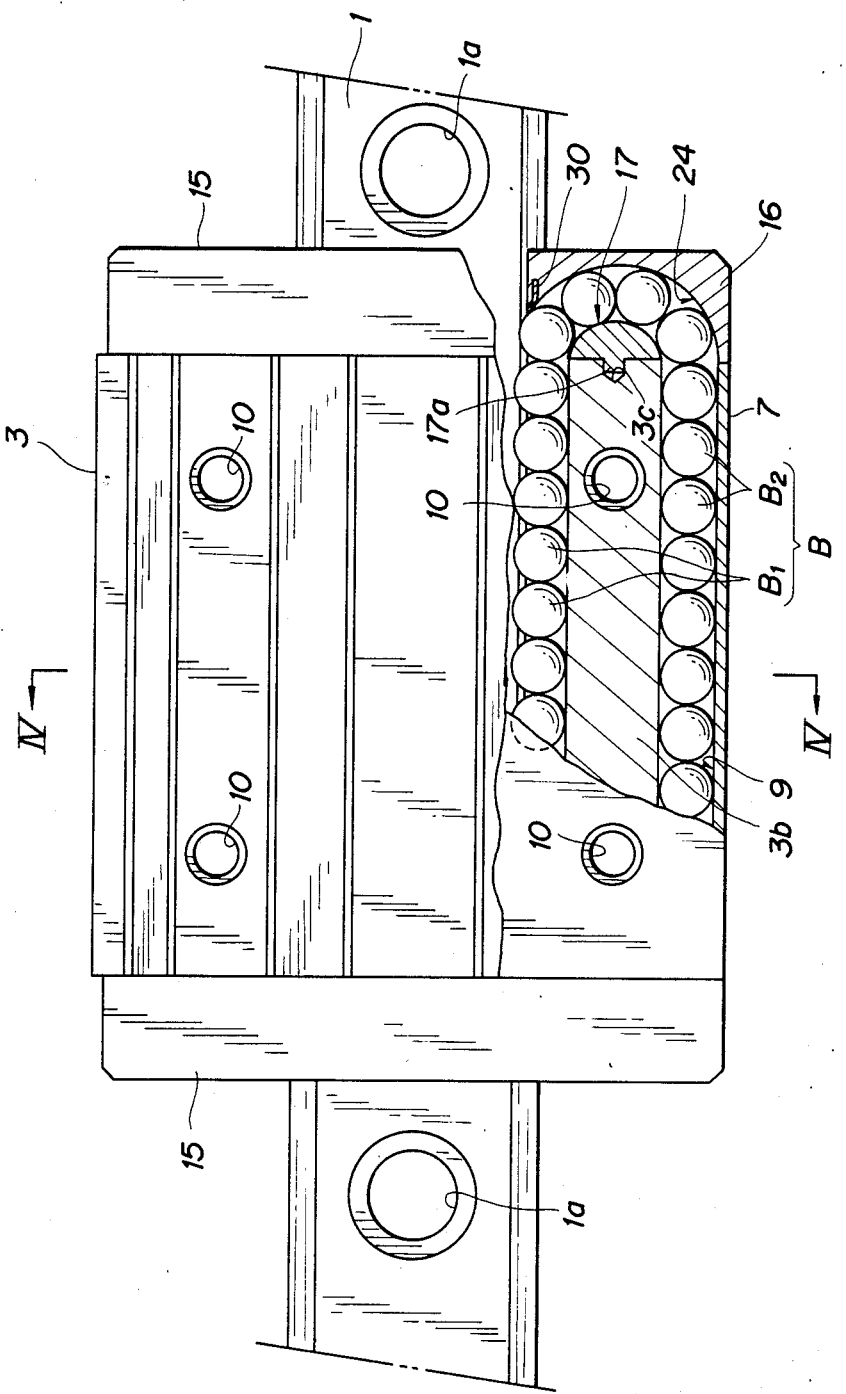
FIG. 1 is a partially-sectional plan view of a bearing unit embodiment of the present invention.

An embodiment of a linear-motion bearing unit according to the present invention will be described hereinunder with reference to the accompanying drawings.

Referring first to FIGS. 1 to 4 which show the configuration of the linear-motion bearing unit according to the invention, the bearing unit has a track shaft 1 and a bearing body 3 which is mounted on the track shaft 1 in such a manner that it can move in the longitudinal direction thereof through a multiplicity of steel balls B,B which serve as rolling members.

The track shaft 1 has on the upper portion thereof and on its both sides a pair of shoulders 4, 4 which project sideways and extend in the longitudinal direction. A pair of loaded ball rolling grooves 4a, 4a are formed on upper and lower corners of each shoulder 4 in such a manner that they are spaced apart in the vertical direction. The track shaft 1 is secured to a bed (not shown) by means of bolts which are driven into the bed through vertical bolt holes 1a, 1a formed in the track shaft 1 at a suitable longitudinal interval.

Figure 4:
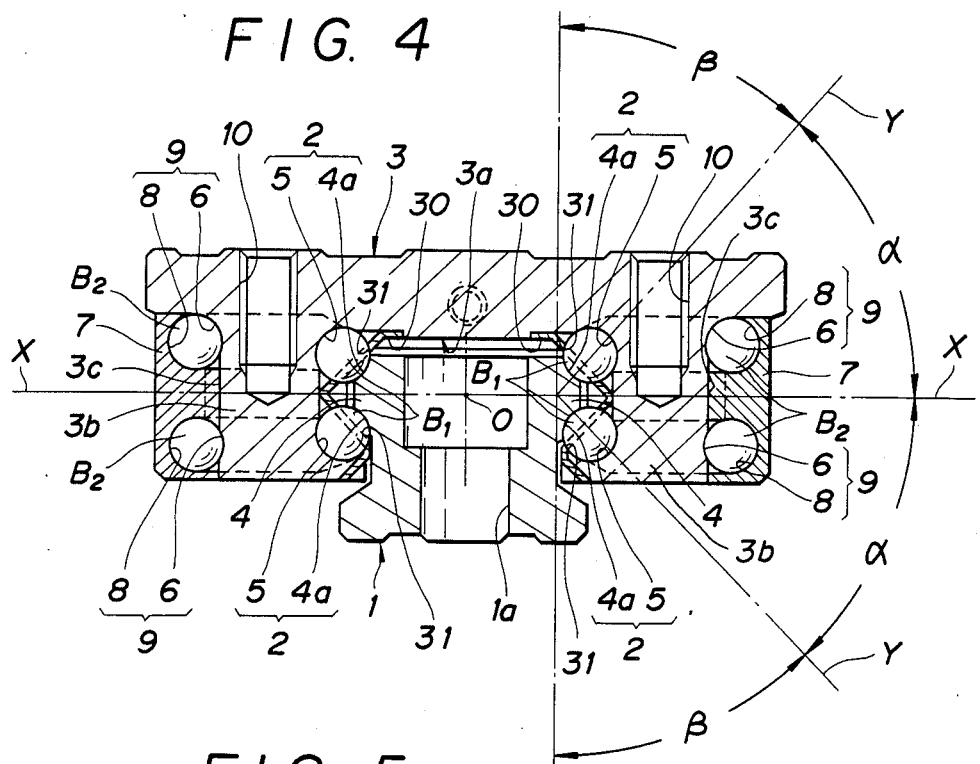
FIG. 4 is a sectional view taken along the line IV—IV of FIG. 1.

A bearing body 3 is in the form of a block having a substantially inversed U-shaped cross-section, as shown in FIG. 4, and has in a central lower portion thereof a longitudinal central recess 3a which has substantially inversed U-shape with its bottom sides slightly projecting towards each other, as well as longitudinal skirts 3b, 3b on either side of the central recess 3a.

Loaded ball rolling grooves 5, 5, which have a radius of curvature slightly larger than that of the steel balls, are formed in the longitudinal direction at the upper and lower corners of the inner side of each skirt 3b in such a manner that they extend along the entire length of the bearing body 3 and face the loaded ball rolling grooves 4a, 4a provided on each protruding portion 4 of the tack shaft 1. These opposing loaded ball rolling grooves 4a, 4a and 5, 5 together constitute loaded ball rolling passages 2, 2. The loaded ball rolling grooves 5, 5 are arranged in the vertical direction in such a manner that they are symmetrical with respect to a horizontal line X which represents the center line of the inner side of each skirt 3b and passes through the center O of the bearing body 3. The center of curvature of the arc of the loaded ball rolling groove 5 is always on a line Y which intersects the horizontal line X at an angle $\alpha$ which is 45 degrees. Since the center of curvature of the arc of the individual loaded ball rolling grooves 5, 5 is aligned with the lines Y, Y in this way, the angle of contact $\beta$ between the individual loaded ball rolling grooves 5, 5 and the steel balls $B_1$, $B_1$ associated with the respective grooves can be made to be 45 degrees. In addition, when a load is applied, the contact area is increased by the elastic deformation generated on the loaded ball rolling grooves 5, 5 and the associated loaded balls $B_1$, $B_1$, reducing the load per unit area of the contacting surfaces, thus increasing the load capacity of the bearing unit.

Figure 5:
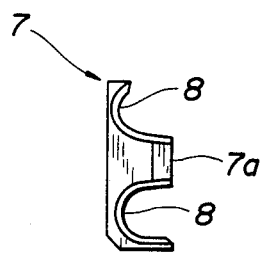
FIG. 5 is a front elevational view of a side plate.
Figure 6:
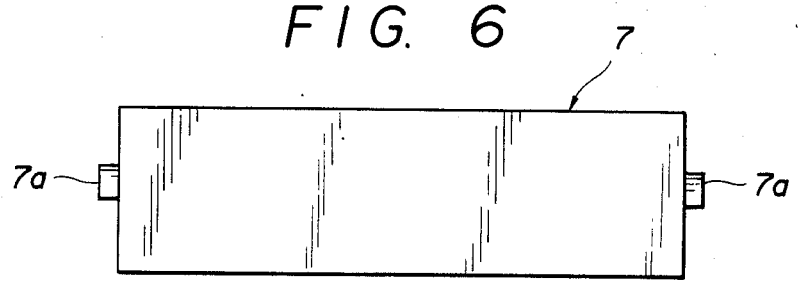
FIG. 6 is a side elevational view of the side plate of FIG. 5, as seen from the left side thereof.
Figure 7A:
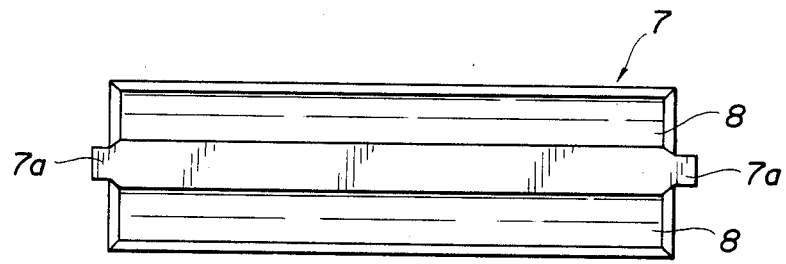
FIG. 7 (a) is a side elevational view of the side plate of FIG. 5, as seen from the right side thereof.
Figure 7B:
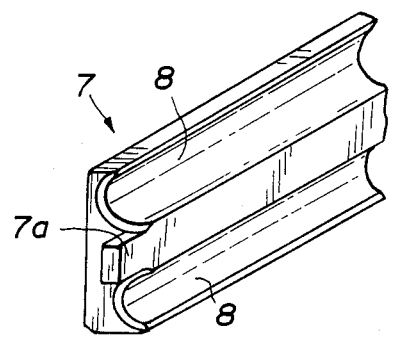

The outer side of the skirt 3b of the bearing body 3 is provided with a notch which has a substantially rectangular cross-section and extends in the longitudinal direction. Shallow non-loaded ball rolling grooves 6, 6, which have a slightly larger radius of curvature than that of the steel balls, are formed in two rows in the longitudinal direction on the vertical wall of the notch 3c in such a manner that they are spaced apart from each other in the vertical direction and run parallel to each other. A side plate 7 of a synthetic resin is secured to the above-mentioned notch 3c of the bearing body 3 in such a manner that it extends along substantially the entire length of the bearing body 3 in the longitudinal direction thereof. The side plate 7 has a substantially rectangular cross-section, as shown in FIGS. 5 to 7. Non-loaded ball rolling grooves 8, 8, which have a slightly larger radius of curvature than that of the steel balls and an arcuate cross-section are formed in two rows in the longitudinal direction on upper and lower portions of the inner side of each side plate 7. The non-loaded ball rolling grooves 8, 8 extend along the entire length of the side plate and face the corresponding non-loaded ball rolling grooves 6, 6 provided in the skirt 3b of the bearing body 3. The non-loaded ball rolling grooves 8, 8 cooperate with the non-loaded ball rolling grooves 6, 6 provided on the bearing body 3, in constituting non-loaded ball rolling passage 9, 9 in which non-loaded rolling members roll. A pair of protruding locking members 7a, 7a are integrally formed on the longitudinal ends of each side plate 7 and on the inner side thereof in such a manner that they extend in the longitudinal direction, outward from the substantially central portion of the side plate. In addition, since the side plates 7, 7 are made of a synthetic resin material, the noise is effectively reduced when the steel balls B, B collide with the walls of the non-loaded ball rolling grooves 8, 8 during rolling along the non-loaded ball rolling grooves 8, 8 provided on the inner side of each side plate 7.

Reference numerals 10, 10 in the drawings denote holes provided on the bearing body 3 so that the bearing body 3 can be secured to a travelling table (not shown) by a fastening means such as bolts.

Figure 8:
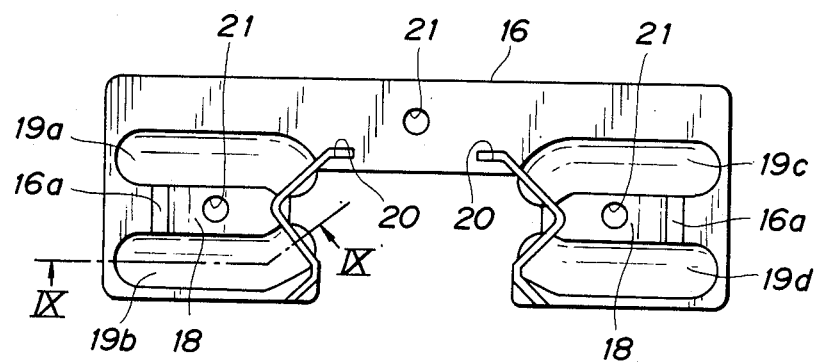
FIG. 8 is a front elevational view of an end plate body.
Figure 9:
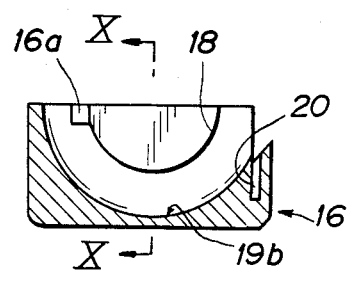
FIG. 9 is a sectional view taken along the line IX—IX of FIG. 8.
Figure 10:
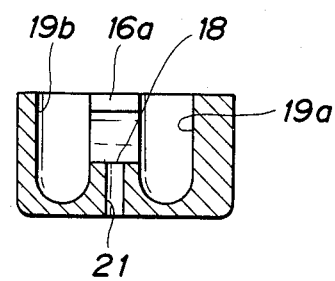
FIG. 10 is a sectional view taken along the line X—X of FIG. 9.

An end plate 15 is mounted on each end of the bearing body 3. As shown in FIG. 1, the end plate 15 has an end plate body 16 and inner members 17, 17 which are fitted into the inner side of the end plate body 16. The end plate body 16, as shown in FIGS. 8 to 10, has an external view of substantially inversed U-shape, like the bearing body 3, and on the portions of its inner side which corespond to the skirts 3b, 3b of the bearing body 3, has U-shaped ball direction turning grooves 19a, 19b, 19c and 19d formed in two rows (see FIGS. 8 to 10). The grooves 19a, 19b, 19c and 19d have a substantially arcuate horizontal cross-section and a semi-circular cross-section, and connect the loaded ball rolling passages 2, 2; 2, 2 and the corresonding non-loaded ball rolling passages 9,9; 9, 9, respectively. The initial and terminating ends of each U-shaped ball direction turning groove 19 are connected to the initial and terminating ends of the loaed ball rolling passage 2 and the corresponding non-loaded ball rolling passage 9. As shown in FIGS. 8 to 10, fitting grooves 18, 18 having a semi-circular cross-section are formed in a concentric configuration with the arc of the U-shaped ball direction turning groove, on the projecting portions of the inner side of the end plate body 16 which are located between the U-shaped ball direction turning grooves 19a and 19b, and between the grooves 19c and 19d. An inner member 17 having a substantially semi-cylindrical shape is fitted into each fitting groove 18 in such a manner that the outer peripheral surface of the inner member 17 corresponds to the groove surface of the fitting groove 18.

Figure 11:
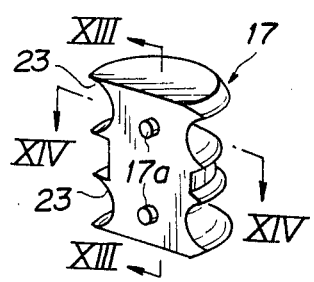
FIG. 11 is a perspective view of an inner member of the end plate.
Figure 12:
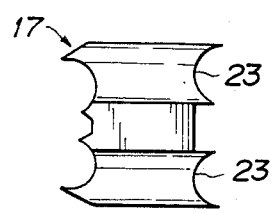
FIG. 12 is a rear view of the inner member.
Figure 13:
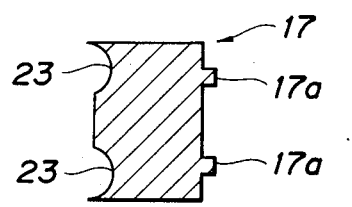
FIG. 13 is a sectional view taken along the line XIII-—XIII of FIG. 11.
Figure 14:
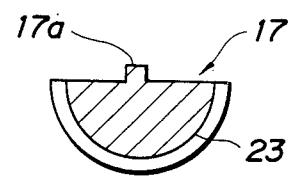
FIG. 14 is a sectional view taken along the line XIV—XIV of FIG. 11.

As shown in FIGS. 11 to 14, the inner member 17, which is fitted into each fitting groove 18 provided on the inner side of the end plate body 16, has a substantially semi-cylindrical external view (see FIGS. 11 and 14). The length of the inner member 17 extends toward the outer edges of the ball direction turning U-shaped grooves 19a and 19b or 19c and 19d which are positioned at both sides of each fitting groove 18. The inner member 17 is mounted within the fitting groove 18 in such a manner that it intersects the U-shaped ball direction turning grooves 19a and 19b or 19c and 19d which are disposed substantially parallel to each other. U-shaped grooves 23, 23 are formed in two rows on the outer peripheral surface of the inner member 17 which has the same curvature as that of the fitting groove 18 in such a manner that they extend in the same direction as the U-shaped ball direction turning grooves 19,19 and thus correspond to the grooves 19,19 formed on the both sides of the fitting groove 18. When the inner member 17 is fitted into the fitting groove 18 of the end plate body 16, the corresponding U-shaped grooves 19,19; 23,23 form two semiannular connecting passages 24,24 (see FIG. 1). In consequence, when the end plate 15 is secured to the end of the bearing body 3 by means of bolts 25,25 (see FIG. 3), the connecting passages 24,24 connect the corresponding loaded ball rolling passages 2,2 and the non-loaded ball rolling passages 9,9 respectively, thereby forming two rows of endless ball-circulating passages, as shown in FIG. 1.

A pair of positioning protrusions 17a, 17a are provided on the flat inner side of each inner member 17 in such a manner that they are spaced apart from each other in the vertical direction. The positioning protrusions 17a, 17a are fitted into positioning bores 3c, 3c (see FIG. 1) provided on each end of the bearing body 3, so as to position the end plate 15 and the bearing body 3 when the former is mounted onto the latter.

A locking groove 16a, which corresponds to the protruding locking member 7a of the side plate 7, is provided on the outer end of each fitting groove 18. In consequence, when the end plate body 16 is mounted onto the end of the bearing body 3, the protruding locking members 7a, 7a of individual side plates 7, 7 are respectively fitted into the corresponding locking grooves 16a, 16a of the end plate body 16. Further, substantially V-shaped retainer locking grooves 20, 20 are formed on the inner side of each end plate body 16. Each retainer locking groove 20 has inwardly-slanting sections which cross the initial ends of the ball direction turning U-shaped grooves 19, 19.

Reference numeral 21, 21 designate bolt holes used when securing the end plate body 16 to the bearing body 3.

Figure 15:
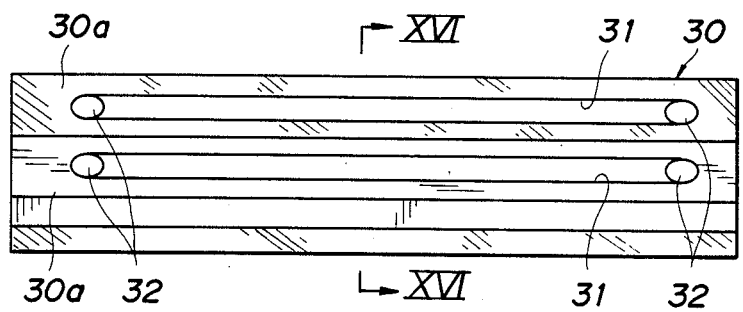
FIG. 15 is a side elevational view of a retainer.
Figure 16:
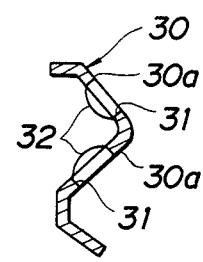
FIG. 16 is a sectional view taken along the line XVI-—XVI of FIG. 15.
Figure 17:
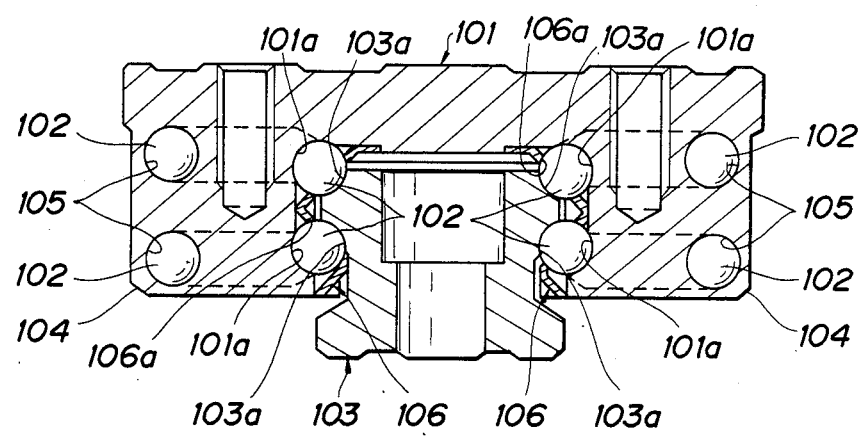
FIG. 17 is a cross-sectional view of a conventional linear-motion bearing unit.

As shown in FIGS. 1 to 4, a pair of retainers 30, 30 are disposed between the loaded ball rolling grooves 5, 5 ; 5, 5 provided on the bearing body 3 and the loaded ball rolling grooves 4a, 4a; 4a, 4a provided on the track shaft 1. Each retainer 30, as shown in FIGS. 15 and 16, is made of a strip of steel plate which is bent so that it has a V-shaped cross-section. Both edges of the retainer 30 are bent such as to form flange portions. Slits 31, 31, which are small enough not to allow the steel balls B, B to drop therefrom, are formed on inwardly-slanting faces 30a, 30a of each retainer 30. A tongue 32 is formed at each end of the slit 31. The tongue 32 is adapted to scoop the steel balls B, B which come rolling between the opposing loaded ball rolling grooves 4a, 5 and charge them into the ball direction turning U-shaped groove 19. The direction of the balls which had been moving in a straight line is thereby smoothly changed. Both ends of this pair of retainers 30, 30 are engaged with the retainer locking grooves 20, 20; 20, 20 provided on the end plate bodies 16, 16 such as to fixedly secure the retainers 30, 30. In addition, when the retainer 30 is inserted in the bearing body 3 with its both ends secured to the individual end plate bodies 16, 16, the central axis of each slit 31 is aligned with the central axes of the associated loaded ball rolling grooves 4a, 5.

As shown in FIGS. 1 to 4, the steel balls B, B which are interposed between the track shaft 1 and the bearing body 3 and circulate therebetween include loaded steel balls $B_1$, $B_1$ rolling through loaded ball rolling passages 2, 2 formed between the track shaft 1 and the bearing body 3 and non-loading steel balls $B_2$, $B_2$ rolling through the non-loaded ball rolling passages 9, 9 formed between the bearing body 3 and the side plates 7, 7. The loaded steel balls $B_2$, $B_2$ and the non-loaded steel balls $B_2$, $B_2$ are actually the same steel balls, and they become loaded steel balls when they are rolled in the loaded area and non-loaded steel balls when they are rolled in the non-loaded area.

The linear-motion bearing unit, which is arranged in the above-described manner according to the present invention, is mounted, for example, on the track shaft 1 of a machining center (not shown), with necessary machine tools set on the bearing body 3. When the bearing unit is moved forward or backward, the loaded steel balls $B_1$, $B_1$ which are held between the loaded ball rolling grooves 5, 5 on the bearing body 3 and the loaded ball rolling grooves 4a, 4a on the track shaft 1 are guided by the retainers 30, 30, and run in one direction. At one end of each retainer 30, the loaded steel balls $B_1$, $B_1$ are scooped by the tongue 32 of the retainer 30, and are led into the connecting passage 24 of a first end plate 15 in which the running direction of the steel balls is reversed. The steel balls then enter the non-loaded ball rolling passage 9 which is formed by the non-loaded ball rolling groove 6 on the bearing body 3 and the non-loaded ball rolling groove 8 on the side plate 7, pass through the connecting passage 24 in a second end plate 15, and return to the loaded ball rolling passage 2. Thereafter, the same course of circulation is repeated.

In the bearing unit according to the present invention which is arranged and operated in the above-described manner, the side plates which are mde of a synthetic resin material are mounted within the longitudinal notches formed on the outer sides of both skirts of a bearing body, such that the side plates and the outer sides of the skirts together consitute non-loaded ball rolling passages. In consequence, it is not necessary to conduct the troublesome and time-consuming drilling which is required in a conventional bearing unit in which the bores used for rolling non-loaded rolling members are drilled in the longitudinal direction within the solid bearing body along its entire length. As a result, operational efficiency can be markedly improved, and drastic reduction in the production cost is possible. Further, since the length of a bearing body is not limited because of the elimination of the drilling conducted over the entire length of the bearing body, the length of a loaded member rolling groove which is formed on the bearing body can be increased without restriction, thereby increasing the overall load capacity of a bearing unit as required. It is therefore possible to manufacture bearing units of various lengths at low cost, depending on the size of the load to be applied. The side plates are formed from a synthetic resin material, and this makes it possible to greatly reduce the noise made by the passing rolling members within non-loaded member rolling passages, and a quiet operation can thus be effected.

What is claimed is:

1. A linear-motion bearing unit comprising:
    a bearing body having a length extending along a longitudinal axis thereof, said bearing body comprising a central portion and two spaced apart depending skirts having opposed inner sides defining with said central portion a recess extending along the lognitudinal length of said bearing body so as to exhibit a generally U-shaped transverse cross-section, said skirts being provided with grooves on inner and outer side surfaces thereof;
    a track shaft disposed in the recess defined by said bearing body, said track shaft being provided with grooves on outer surfaces thereof so as to form passageways for loaded balls in combination with the inner grooves of said skirts;
    side plates connected to the outer side surfaces of said skirts, respectively, each side plate having a longitudinal length substantially equal to the longitudinal length of said skirt to which said side plate is connected; and
    end caps mounted on each longitudinal end of said bearing body;
    each of said side plate being made of a solid non-metal material and provided on its inner surface with grooves which define, in combination with corresponding said outer grooves formed on the outer side surface of said skirt, passageways for non-loaded balls, said grooves in the inner surface of each side plate having a shape so as to closely hold the outer surfaces of said non-loaded balls with substantially no space between said passageways and said non-loaded balls rolling therethrough.

2. A linear bearing unit as recited in claim 1 wherein each side plate is made from a synthetic resin.

3. A linear bearing unit as recited in claim 1 wherein the outer side surface of each skirt has formed thereon two grooves and each side plate inner surface has formed thereon two grooves whereby two passageways for non-loaded balls are associated with the outer side of each skirt.

4. A linear bearing unit as recited in claim 3 wherein each side plate is mae from a synthetic resin.

5. A linear bearing unit as recited in claim 1 wherein each end cap has a semi-circular passage connecting each respective loaded ball passageway and non-loaded ball passageway.

* * * * *

UNITED STATES PATENT AND TRADEMARK OFFICE
CERTIFICATE OF CORRECTION

PATENT NO. : 4,674,893
DATED : June 23, 1987
INVENTOR(S) : Hiroshi Teramachi

It is certified that error appears in the above-identified patent and that said Letters Patent is hereby corrected as shown below:

In claim 1, at line 7 thereof, delete "lognitudinal" and insert -- longitudinal --.

In claim 4, at line 2 thereof, delete "mae" and insert -- made --.

Signed and Sealed this

Seventeenth Day of November, 1987

Attest:

DONALD J. QUIGG

Attesting Officer

Commissioner of Patents and Trademarks